United States Patent [19]

Lundy

[11] Patent Number: 4,647,078

[45] Date of Patent: Mar. 3, 1987

[54] METAL TO COMPOSITE TUBULAR JOINTS

[75] Inventor: Brian T. Lundy, Murray, Utah

[73] Assignee: Hercules, Incorporated, Wilmington, Del.

[21] Appl. No.: 810,702

[22] Filed: Dec. 19, 1985

[51] Int. Cl.⁴ ............................................. F16L 55/00
[52] U.S. Cl. ..................................... 285/149; 285/55; 285/115; 285/917
[58] Field of Search ................. 285/149, 55, 115, 917, 285/328

[56] References Cited

U.S. PATENT DOCUMENTS 1,808,094  6/1931  Yackey .................................. 285/55
2,076,632  4/1937  Goodall ................................ 285/85
3,661,670  5/1972  Pierpont .
4,093,280  6/1978  Yoshizawa et al. ............ 285/328 X
4,248,062  2/1981  McLain et al. .
4,259,382  3/1981  Schwan .
4,351,364  9/1982  Cocks .
4,528,060  7/1985  Gill et al. .

Primary Examiner—Richard J. Scanlan, Jr.
Attorney, Agent, or Firm—Connolly & Hutz

[57] ABSTRACT

A metal to composite tubular joint includes an inner metal sleeve over which is mounted a composite tube made from a plurality of fiber layers. An axial load transfer assembly made of a plurality of metal members is mounted around the composite tube. One end of the joint is threaded for detachably coupling the joint to another structural element such as a pipe or a further joint. The end of the joint also includes a seal to assure that fluid leakage is prevented.

27 Claims, 6 Drawing Figures

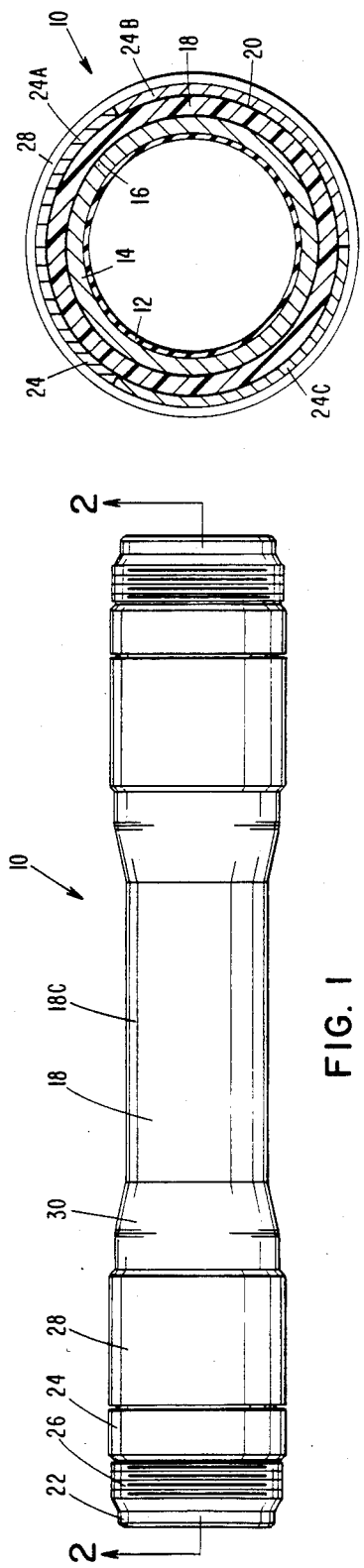
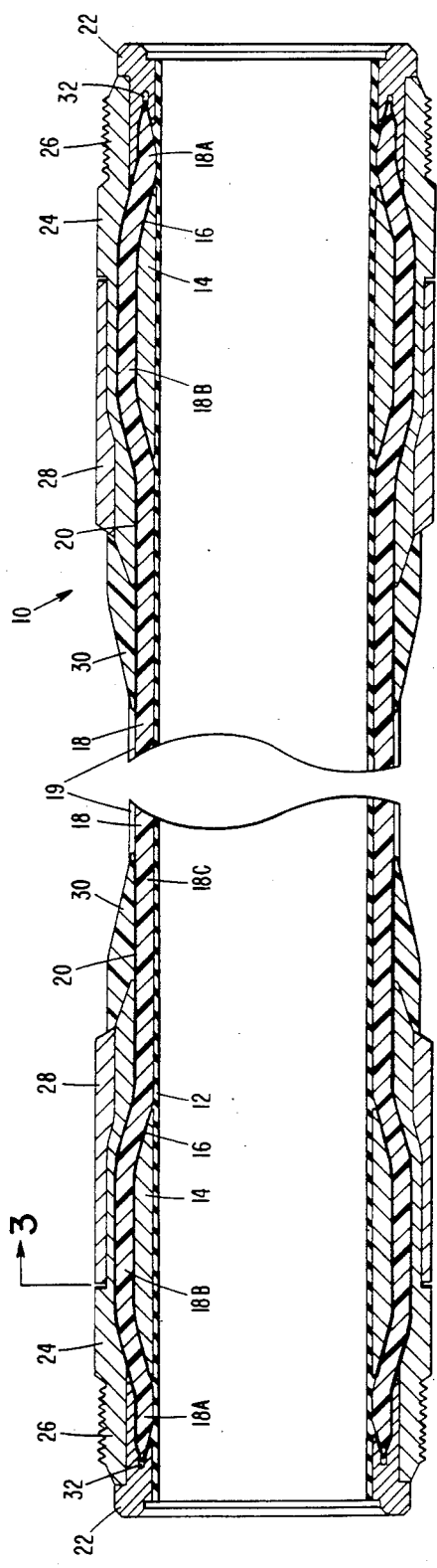

METAL TO COMPOSITE TUBULAR JOINTS

BACKGROUND OF THE INVENTION

The present invention is directed to tubular joints and more particularly to metal to composite tubular joints. Various joints exist for various purposes in the art. One such purpose is to connect pipe sections in a drilling rig such as used in the oil fields. In such environments the pipe sections and joints are disposed in a tubular casing which could be many hundreds of feet long. The structure is not only subjected to high axial loads and pressures but also has dimensional constraints imposed by the inner diameter of the tubular casing.

It would be desirable to provide a joint for the above and other purposes wherein use could be made of the physical properties of metal materials as well as the physical properties and economic advantages of composite materials such as graphite and glass. One difficulty in attempting to combine metal and composite materials for such uses is in the manner of manufacturing the components so as to withstand the loads and pressures while still affording the economic benefits therefrom.

Exemplary prior art describing joints and the like are found in U.S. Pat. Nos. 3,661,670, 4,093,280, 4,248,062, 4,259,382 and 4,351,364.

SUMMARY OF THE INVENTION

An object of this invention is to provide a metal to composite tubular joint which takes advantage of the properties of the metal and composite materials as discussed above.

A further object of this invention is to provide such a tubular joint which may be readily manufactured and assembled in an economical manner.

A yet further object of this invention is to provide such a tubular joint which may be made in varying lengths and wherein the metal components are located at the ends of the joint with the major portion being made of the composite materials.

A still yet further object of this invention is to provide such a joint which may be effectively coupled to another tubular member without requiring separate fasteners.

In accordance with this invention a metal to composite tubular joint includes an inner metal or composite sleeve for transferring mechanical loads applied to the joint. A composite tube formed from a plurality of fiber layers is mounted over the inner layer sleeve. An axial load transfer assembly is mounted over the composite tube. To facilitate the manufacturing of the joint the axial load transfer assembly is made of a plurality of metal members which are locked together. Coupling means is provided at one end of the joint for detachably coupling the joint to a further tubular structure such as a pipe or another joint without the need for separate fastening members. The coupled end of the joint is provided with sealing means to prevent fluid leakage.

The axial load transfer assembly may comprise three identical segments each of which covers an arc of 120° so that when assembled an annular member is formed and the components may be locked together by a metal collar which also functions to carry the resulting hoop stress.

The composite tube may be formed from graphite layers wherein the fibers are alternatively disposed at 0° and 90°. In certain practices other angles may be used. For some purposes intermediate layers may be made of glass fibers.

Elastomeric liners such as made from rubber may be provided as the innermost layer and between various components to promote corrosion resistance as well as providing a good wear surface which forms an impermeable barrier.

THE DRAWINGS

FIG. 1 is a side elevation view of a metal to composite tubular joint in accordance with this invention;

FIG. 2 is a cross-sectional view taken through FIG. 1 along the line 2—2.

FIG. 3 is a cross-sectional view taken through FIG. 2 along the line 3—3;

DETAILED DESCRIPTION

Figure 4:
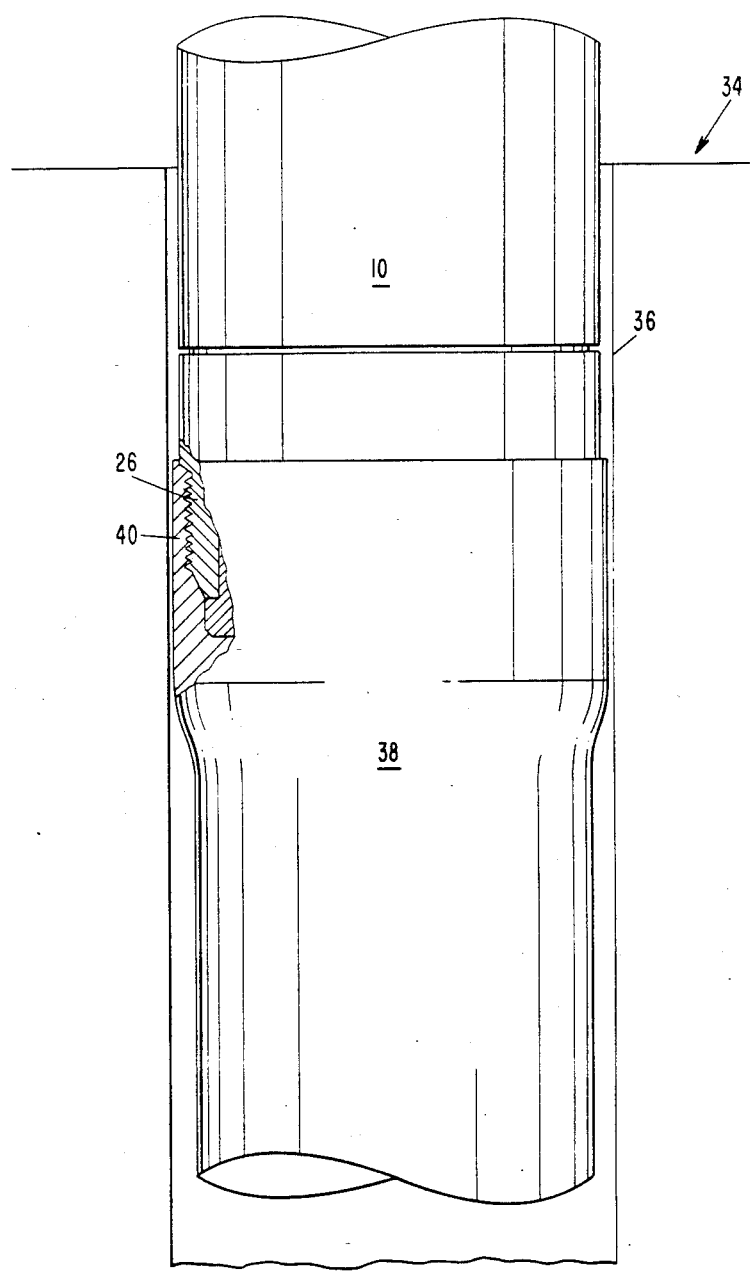
FIG. 4 is a schematic view of an oil well rig utilizing the tubular joint of FIGS. 1–3 and FIGS. 5–6 are plan views of the tube at its joint section and membrane section showing the fibre layer arrangement.

FIGS. 1–2 show a tubular joint 10 in accordance with this invention. Joint 10 is particularly constructed so as to withstand high axial loads and pressures such as occurs in oil field applications with drilling rigs as well as other areas which transfer fluids with high loads. Although joint 10 is relatively complex in structure, its features are such that the components may be assembled using existing high speed tube manufacturing techniques. The preferred embodiment of this invention will be discussed with regard to its use in oil drilling rigs wherein joint 10 can carry high axial loads and high pressure. It is to be understood that the concepts of this invention may be practiced for other purposes.

As shown in FIG. 2, joint 10 includes an inner liner 12 made of an elastomeric material such as butyl rubber. A step sleeve 14 is mounted over rubber liner 12. Step sleeve 14 is made from a metal such as a titanium alloy or composite such as graphite and functions to transfer mechanical loads applied to the joint. A shear layer such as a further rubber liner 16 is applied over step sleeve 14 to distribute the load instead of having a concentration of shear load, as well as to increase compliance between the members on each side of layer 16. Next composite tube 18 is formed being in contact with shear layer 16 at the ends of joint 10 and with inner layer 12 in other portions of joint 10. A further shear layer 20 is mounted over composite tube 18 at each end of joint 10.

As illustrated in FIG. 2, each end of composite tube 18 is inserted in an annular recess in seal ring 22 which is made of a suitable material such as titanium or inconel for providing a fluid seal for joint 10. FIG. 2 also illustrates a particularly important member of joint 10, namely the axial load transfer member 24. As later described and as shown in FIG. 3, axial load member 24 is actually an assembly which is formed by three annular segments 24A, 24B, 24C, each of which is 120° so that a segmented collar is formed by the individual members of the assembly. A portion 26 at one end of collar 24 is externally threaded to form a coupling means so that each end of the joint 10 may be connected to another tubular member having a complementary internally threaded coupling means. The other tubular member may be a pipe or a further joint. Where a further joint is used, a suitable adapter such as an internally threaded collar could be permanently or detachably mounted on one of the joints for detachable connection to the other joint.

The individual segments of axial load transfer assembly 24 are held or locked together by a press fit sleeve 28. Sleeve 28 and segmented collar 24 are made of a suitable metal material such as steel. Sleeve 28 functions not only to lock the components of assembly 24 together but also to carry the resulting hoop stress.

The final component of joint 10 is overwrap 30 which is provided in the area of joint 10 where sleeve 28 and assembly 24 terminate. Overwrap 30 functions to minimize bending stress at the inboard corner at this portion of joint 10.

Joint 10 may be of any suitable length in accordance with its intended use. Typically the length may be fifty feet for use in a drilling rig. Despite the relatively long length of joint 10, the thickness thereof is minimized which is particularly important where joint 10 is inserted in a casing.

Although joint 10 is of relatively complex structure in order to provide an effective joint capable of carrying high axial loads and high internal pressure, joint 10 is of a structure which leads itself to high speed tube manufacturing. The following describes a preferred manner of manufacturing joint 10.

Inner layer 12 is wound in strips about a steel mandrel appropriately coated with a releasing agent such as Teflon. Alternatively inner layer 12 may be formed by spraying liquid rubber inside the joint after the remaining layers have been formed and the mandrel removed. The liner material of inner layer 12 is selected to take into account such factors as the temperature and the chemical environment within the tube, but the layer 12 must be corrosion resistant. Inner layer 12 functions to provide a good wear surface and a fluid impermeable barrier.

Step sleeve 14 is next placed adjacent to the inner layer 12. Step sleeve 14 may be formed of a titanium alloy coated with rubber or graphite epoxy. An epoxy resin may be used to bond sleeve 14 to the inner layer or liner 12. Step sleeve 14 provides a means of transferring mechanical loads applied to the composite joint.

The next assembled member is shear ply layer 16 which may be made of NRB rubber cut and calendared into sheets of, for example, 0.02 inch thickness wound over step sleeve 14. If step sleeve 14 is made of a graphite composite, a film adhesive is used to bond step sleeve 14 to the shear layer 16. Shear layer 16 functions to increase the compliance between step sleeve 14 and composite tube 18. Layer 16 is referred to as a shear layer because it distributes the shear load to prevent a concentration of that load.

Composite tube 18 is then formed on the mandrel. As illustrated in FIG. 2, composite tube 18 conforms to the irregular form resulting in the inclusion of step sleeve 14 and each longitudinal half of tube 18 includes three sections, namely an end portion 18A, a joint portion 18B and a membrane portion 18C. End portion 18A extends outwardly away from inner layer 12 and is received in an annular recess 32 in seal ring 22. As illustrated, a portion of end portion 18A between seal ring 22 and step sleeve 14 would, however, contact inner layer 12. Joint portion 18B is in contact with shear layer 16 while the remaining membrane portion 18C contacts inner layer 12.

Figure 5:
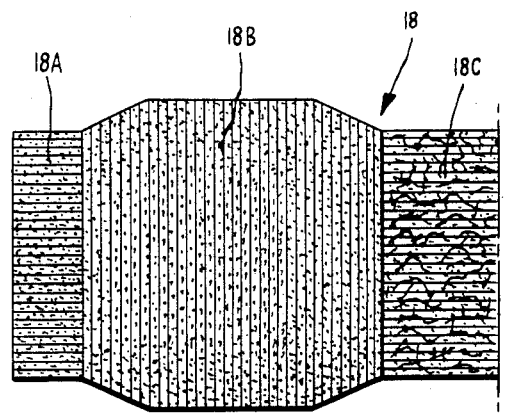
Figure 6:
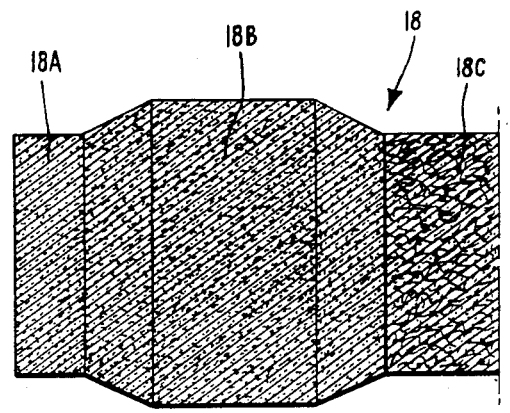

Composite tube 18 forms an important part of joint 10. Composite tube 18 is made of materials so selected as to take advantage of their structural properties while providing economy to the resultant joint structure by eliminating the need for metal components except at the joint ends. In the preferred practice of this invention, composite tube 18 is of multi-layer construction wherein alternate layers are formed of fibers disposed at different angles to the intermediate layers. Preferred fiber materials are AS4 graphite/epoxy fibers and S2 glass fibers. Other materials could be used in accordance with the specific requirements. The specific materials and the angle of orientation are selected in accordance with the desired results. For example, graphite fibers have a modulus of elongation which is about four times that of glass fibers. Graphite fibers provide a higher stiffness but have the disadvantage of being more expensive than glass fibers. Glass fibers on the other hand have better shock resistance properties. Where stiffness is required, all of the layers might be made of graphite fibers. Where stiffness is not as important, glass fibers would be used in the composite to minimize cost. The angle at which the fibers are laid would also vary in accordance with the intended results. A low angle would give higher strength while a high angle would make the tube strong in hoop and load strength. If internal pressure were the only consideration, the same angle such as 54.75° could be used as shown in FIG. 6. The reference to degrees is made with respect to the tube axis. Thus 0° is coaxial with the tube axis, while 90° is perpendicular to the tube axis. The invention may be practiced wherein tube 18 comprises ten layers with the first and other odd numbered layers being laid at an angle of 90°±5° and the intermediate layers at 0°. The invention may be practiced as shown in FIG. 5. wherein end section 18A and joint section 18B are composed solely of graphite fiber layers, while the membrane section 18C has alternating layers of graphite and glass fibers with the glass fibers being ±85°. This could be accomplished by having the intermediate ±85° graphite fibers of joint section 18B merge with the ±85° glass fibers through tow or roving drop offs and pick ups at a distance of about one foot away from the end of joint section 18B. The hybrid composite tube design thus provides high composite strength and stiffness in the joint region and low cost of the tube membrane which comprises the major length of joint 10. In the preferred practice of this invention the wall thickness of tube 18 is 0.32 inches and has a 0° to ±85° thickness ratio of 0.333.

After composite tube 18 has been formed, a second rubber shear layer 20 is wound over the composite tube 18, and the tube 18 is vulcanized. The composite tube 18 may then be machined to obtain the proper configuration for applying the seal ring 22 and segmented collar 24. The mandrel upon which the composite tube is formed may be optionally removed at this point.

Rubber coated segmented steel collar 24 encloses the step joint section 18B of composite tube 18. As illustrated in FIG. 3, collar 24 is actually an assembly comprising three segments 24A, 24B and 24C each forming an arc of 120° and together forming an annular collar completely encircling the composite joint section. Collar 24 is in segmented form to facilitate the assembly thereof over composite tube 18. Because each segment is less than 180°, it is possible to conveniently fit each segment around tube 18 while still precisely dimensioning the parts with close tolerances. It is to be understood that the invention may be practiced by forming segmented collar 24 with as little as two members, each 180° or with more than three members. Three members, however, are preferred for ease of assembly.

As illustrated in FIG. 2, segmented collar 24 is externally threaded at 26 for contacting joint 10 to other pipes, joints or the like. In addition segmented collar 24 functions as the primary axial load transfer member of joint 10 and thus may be considered as an axial load transfer assembly.

Outer sleeve 28 preferably made of steel is press fit or shrink fit around segmented collar 24. Sleeve 28 functions as a locking means to hold the individual segments of collar 24 together and also to carry resulting hoop stress.

Seal ring 22 is next bonded to the machined end 18A of composite tube 18 to provide a high pressure fluid seal. Seal ring 22 may be made of any suitable material selected to provide a sealing surface for coupling the metal or joint 10 with the metal of the pipe or other tubular structural element. The material selected for ring 22 should be one having a modulus of elasticity in the hoop direction no higher than that of the metal used in collar 24. Where collar 24 is made of steel, seal ring 22 is preferably made of titanium or inconel. When threaded coupling 26 is secured to the complementary coupling of the further structural element, seal ring 22 is compressed about end 18A which is located in annular recess 32 to effectively seal the connection.

It is also desirable to provide joint 10 with hoop overwrap 30 made, for example, of graphite fiber materials at the portion of tube 18 adjacent metal ring 28 and metal collar 24 to minimize bending stress at the inboard corner. As shown in FIG. 2, joint 10 is also provided with a sacrificial layer 19 in the membrane region between overwraps 30, 30. Layer 19 may be made of any suitable material such as glass fibers.

Joint 10 can be manufactured using the high speed filament tube process such as used in producing composite drive shafts. In this regard, reference is made to U.S. Pat. No. 4,528,060. The manufacturing process may utilize mandrels thirty feet in length hooked together to form a continuous chain to form the tubular joint 10. The mandrels move through the continuous filament wound process in which all winding and curing of fibers is formed in one circuit along with all necessary machining operations.

Joint 10 combines the structural properties of the metals and the filament wound composite tube discussed above with minimal corrosive risk, high pressure seal capability and minimal size differential between the pipe and joint outside diameters. The expected performance of joint 10 in an environment from −40° F. to 270° F. is a maximum working pressure of 10,000 psi, a minimum burst pressure of 16,250 psi, a collapse pressure of 5,300 psi, a maximum axial load of 75,000 pounds. The weight of tube 10 when forty feet long would be 242 pounds or about 6 pounds per foot. The maximum outside diameter would be 6.35 inches and the minimum inside diameter of 3.98 inches.

FIG. 4 schematically illustrates an oil well drilling rig 34 which utilizes the tubular joint of this invention. Rig 34 may take any suitable form since the details of the rig, per se, do not form a part of the invention. As shown in FIG. 4, rig 34 includes a casing 36 in which is mounted a pipe 38 for transporting fluid under pressure. The end 40 of pipe 38 is internally threaded for engagement with threaded portion 26 of tubular joint 10. It is to be understood that rig 34 merely exemplifies a working environment for this invention. The invention, however, may be practiced in other environments such as under water drilling. It is also to be understood that where joint 10 is used in a casing, the casing need not be straight but could be curved or irregularly shaped. Similarly joint 10 need not be used in any casing.

As can be appreciated, tubular joint 10 provides a significant step forward in the art by being adaptable to existing manufacturing techniques for high speed tube manufacturing. Moreover, tubular joint 10 results in minimal rust corrosion while being capable of high sustained and fatigue loads with no ill effects from residual stress. Tubular joint 10 provides a high pressure seal in which all of the steel elements are isolated from possible internal fluid.

What is claimed is:

1. A metal to composite tubular joint comprising an inner sleeve for transferring mechanical loads applied to said joint, a composite tube mounted over and coaxial with said inner sleeve, said composite tube being formed from a plurality of fiber layers, an axial load transfer assembly mounted around said composite tube, said assembly being made of a plurality of members which together form an annular segmented collar, locking means holding said plurality of members in contact with each other to form said segmented collar, coupling means at one end of said joint for detachably coupling said joint to a further tubular structural element having complementary coupling means without the use of separate and discrete fastening members, said one end of said joint having sealing means whereby a fluid may flow through said joint and its connection to the further tubular structural element without any fluid leakage therethrough , including a plurality of elastomeric layers comprises an inner layer in contact with the inner surface of said inner sleeve and said composite tube, a first shear layer disposed between said inner sleeve and said composite tube, and a second shear layer disposed between said composite tube and said segmented collar.

2. The tubular joint of claim 1 wherein said locking means comprises a metal sleeve mounted around said plurality of members.

3. The tubular joint of claim 2 including an overwrap located at the inboard corner where said metal sleeve and said segmented collar meet said composite tube.

4. A metal to composite tubular joint comprising an inner sleeve for transferring mechanical loads applied to said joint, a composite tube mounted over and coaxial with said inner sleeve, said composite tube being formed from a plurality of fiber layers, an axial load transfer assembly mounted around said composite tube, said assembly being made of a plurality of members which together form an annular segmented collar, locking means holding said plurality of members in contact with each other to form said segmented collar, coupling means at one end of said joint for detachably coupling said joint to a further tubular structural element having complementary coupling means without the use of separate and discrete fastening members, said one end of said joint having sealing means whereby a fluid may flow through said joint and its connection to the further tubular structural element without any fluid leakage therethrough, and said segmented collar is externally threaded at its outermost end to comprise said coupling means.

5. The tubular joint of claim 4 wherein said axial load transfer assembly comprises three individual members each of which is a segment disposed over an arc of 120° to form said annular segmented collar.

6. The tubular joint of claim 4 wherein said locking means comprises a metal sleeve mounted around said plurality of members.

7. The tubular joint of claim 6 wherein said sealing means comprises a sealing ring having an annular recess, and the remote end of said composite tube being mounted in said annular recess.

8. The tubular joint of claim 7 wherein said plurality of fiber layers comprises alternate layers wound at one angle and intermediate layers wound at another angle with respect to the axis of said tubular joint.

9. The tubular joint of claim 8 wherein said fiber layers include at least some layers made of graphite fibers.

10. The tubular joint of claim 9 wherein at least some of said layers includes glass fibers.

11. The tubular joint of claim 10 including a plurality of elastomeric layers.

12. The tubular joint of claim 11 wherein said plurality of elastomeric layers comprises an inner layer in contact with the inner surface of said inner sleeve and said composite tube, a first shear layer disposed between said inner sleeve and said composite tube, and a second shear layer disposed between said composite tube and said segmented collar.

13. The tubular joint of claim 12 including an overwrap located at the inboard corner where said metal sleeve and said segmented collar meet said composite tube.

14. The tubular joint of claim 13 wherein said inner sleeve is made of a metal or composite material.

15. The tubular joint of claim 14 wherein each end of said joint is of mirror image structure to each other to form a pair of joint sections, and said joint including a membrane section between said joint sections.

16. The tubular joint of claim 15 wherein said membrane section comprises a major portion of said joint along the length thereof, said plurality of fiber layers at said joint sections being alternating layers of graphite fibers, and said plurality of fiber layers in said membrane section being alternating layers of graphite fibers and glass fibers.

17. The tubular joint of claim 7 wherein said sealing ring is made of a metal material having a modulus of elasaticity no greater than the modulus of elasticity of said segmented collar.

18. The tubular joint of claim 8 wherein said angles of said plurality of fiber layers are 0° and ±85° with respect to the axis of said tubular joint.

19. The tubular joint of claim 4 wherein each end of said joint is of mirror image structure to each other to form a pair of joint sections, and said joint including a membrane section between said joint sections.

20. The tubular joint of claim 19 wherein said membrane section comprises a major portion of said joint along the length thereof, said plurality of fiber layers at said joint sections being alternating layers of graphite fibers, and said plurality of fiber layers in said membrane section being alternating layers of graphite fibers and glass fibers.

21. A metal to composite tubular joint comprising an inner sleeve for transferring mechanical loads applied to said joint, a composite tube mounted over and coaxial with said inner sleeve, said composite tube being formed from a plurality of fiber layers, an axial load transfer assembly mounted around said composite tube, said assembly being made of a plurality of members which together form an annular segmented collar, locking means holding said plurality of members in contact with each other to form said segmented collar, coupling means at one end of said joint for detachably coupling said joint to a further tubular structural element having complementary coupling means without the use of separate and discrete fastening members, said one end of said joint having sealing means whereby a fluid may flow through said joint and its connection to the further tubular structural element without any fluid leakage therethrough, in combination therewith, a tubular casing, and said joint being detachably coupled to a further tubular structural element.

22. The tubular joint of claim 21 wherein the maximum outside diameter of said joint is 6.35 inches and the minimum inside diameter is 3.98 inches.

23. The tubular joint of claim 21 wherein said tubular casing is part of an oil drilling rig, and said further tubular structural element being a pipe which is internally threaded at its end thereof for threaded engagement with said joint.

24. A metal to composite tubular joint comprising an inner sleeve for transferring mechanical loads applied to said joint, a composite tube mounted over and coaxial with said inner sleeve, said composite tube being formed from a plurality of fiber layers, an axial load transfer assembly mounted around said composite tube, said assembly being made of a plurality of members which together form an annular segmented collar, locking means holding said plurality of members in contact with each other to form said segmented collar, coupling means at one end of said joint for detachably coupling said joint to a further tubular structural element having complementary coupling means without the use of separate and discrete fastening members, said one end of said joint having sealing means whereby a fluid may flow through said joint and its connection to the further tubular structural element without any fluid leakage therethrough, in combination therewith, an oil drilling rig having a tubular casing, said joint being telescoped into said casing, a pipe in said casing, and said pipe having complementary coupling means detachably connected to said coupling means of said joint.

25. A metal to composite tubular joint comprising an inner sleeve for transferring mechanical loads applied to said joint, a composite tube mounted over and coaxial with said inner sleeve, said composite tube being formed from a plurality of fiber layers, an axial load transfer assembly mounted around said composite tube, said assembly being made of a plurality of members which together form an annular segmented collar, locking means holding said plurality of members in contact with each other to form said segmented collar, coupling means at one end of said joint for detachably coupling said joint to a further tubular structural element having complementary coupling means without the use of separate and discrete fastening members, and said one end of said joint having sealing means whereby a fluid may flow through said joint and its connection to the further tubular structural element without any fluid leakage therethrough, and said locking means comprises a metal sleeve mounted around said plurality of members.

26. A metal to composite tubular joint comprising an inner sleeve for transferring mechanical loads applied to said joint, a composite tube mounted over and coaxial with said inner sleeve, said composite tube being formed from a plurality of fiber layers, an axial load transfer assembly mounted around said composite tube, said assembly being made of a plurality of members which together form an annular segmented collar, locking means holding said plurality of members in contact with each other to form said segmented collar, coupling means at one end of said joint for detachably coupling said joint to a further tubular structural element having complementary coupling means without the use of separate and discrete fastening members, and said one end of said joint having sealing means whereby a fluid may flow through said joint and its connection to the further tubular structural element without any fluid leakage therethrough, said sealing means comprising a sealing ring mounted to the remote end of said composite tube, and said sealing ring is made of a metal material having a modulus of elasticity no greater than the modulus of elasticity of said segmented collar.

27. The tubular joint of claim 26 wherein said sealing ring has an annular recess, and said remote end of said composite tube being mounted in said annular recess.

* * * * *